US010358927B2

(12) United States Patent
Okajima et al.

(10) Patent No.: US 10,358,927 B2
(45) Date of Patent: Jul. 23, 2019

(54) VANE, GAS TURBINE PROVIDED WITH THE SAME, METHOD OF MANUFACTURING VANE, AND METHOD OF REMODELING VANE

(71) Applicant: MITSUBISHI HITACHI POWER SYSTEMS, LTD., Kanagawa (JP)

(72) Inventors: Yoshifumi Okajima, Tokyo (JP); Masamitsu Kuwabara, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 568 days.

(21) Appl. No.: 14/899,805

(22) PCT Filed: Mar. 19, 2015

(86) PCT No.: PCT/JP2015/058172
§ 371 (c)(1),
(2) Date: Dec. 18, 2015

(87) PCT Pub. No.: WO2016/002265
PCT Pub. Date: Jan. 7, 2016

(65) Prior Publication Data
US 2016/0201472 A1    Jul. 14, 2016

(30) Foreign Application Priority Data
Jun. 30, 2014    (JP) .................. 2014-134418

(51) Int. Cl.
*F01D 5/18*    (2006.01)
*F01D 9/02*    (2006.01)
(Continued)

(52) U.S. Cl.
CPC ............. *F01D 5/186* (2013.01); *F01D 5/187* (2013.01); *F01D 5/188* (2013.01); *F01D 9/02* (2013.01);
(Continued)

(58) Field of Classification Search
CPC ..... F01D 9/02; F01D 9/04; F01D 9/06; F01D 25/12; F01D 25/24; F01D 5/186;
(Continued)

(56) References Cited

U.S. PATENT DOCUMENTS 4,353,679 A    10/1982 Hauser
5,098,257 A    3/1992 Hultgren et al.
(Continued)

FOREIGN PATENT DOCUMENTS

DE    10 2008 055 574    7/2009
EP    1 930 546    6/2008
(Continued)

OTHER PUBLICATIONS

Extended European Search Report dated Oct. 27, 2016 in corresponding European Application No. 15807779.2.
(Continued)

*Primary Examiner* — David E Sosnowski
*Assistant Examiner* — Brian P Wolcott
(74) *Attorney, Agent, or Firm* — Wenderoth, Lind & Ponack, L.L.P.

(57) ABSTRACT

A retainer that protrudes from an inner shroud of a vane to a radially inner side and extends in a circumferential direction is formed with an opening that passes through the retainer in an axial direction and defines a space through which air flows. A width of the opening in the circumferential direction is wider than a width of a vane body in the circumferential direction at a radially inner end of the vane body at a position of the retainer in the axial direction.

14 Claims, 12 Drawing Sheets

(51) Int. Cl.
  *F01D 9/04* (2006.01)
  *F02C 7/00* (2006.01)
  *F02C 7/18* (2006.01)
  *F01D 25/24* (2006.01)
(52) U.S. Cl.
  CPC .............. *F01D 9/04* (2013.01); *F01D 9/042* (2013.01); *F01D 25/24* (2013.01); *F01D 25/246* (2013.01); *F02C 7/00* (2013.01); *F02C 7/18* (2013.01); *F05D 2220/32* (2013.01); *F05D 2230/10* (2013.01); *F05D 2230/21* (2013.01); *F05D 2230/80* (2013.01); *F05D 2240/12* (2013.01); *F05D 2240/81* (2013.01); *F05D 2260/201* (2013.01); *F05D 2260/202* (2013.01); *F05D 2260/30* (2013.01)
(58) Field of Classification Search
  CPC ...... F01D 5/187; F01D 5/188; F05D 2260/30; F02C 7/18
  See application file for complete search history.

(56) References Cited

U.S. PATENT DOCUMENTS

| 9,441,497 B2* | 9/2016 | Bergman | F01D 9/041 |
| 2010/0129196 A1* | 5/2010 | Johnston | F01D 5/188 |
| | | | 415/115 |

FOREIGN PATENT DOCUMENTS

| EP | 2 096 265 | 9/2009 |
| JP | 61-19804 | 5/1986 |
| JP | 63-63504 | 4/1988 |
| JP | 2-104902 | 4/1990 |
| JP | 4-234537 | 8/1992 |
| JP | 2835382 | 12/1998 |
| JP | 11-257003 | 9/1999 |
| JP | 2001-501703 | 2/2001 |
| JP | 2004-60638 | 2/2004 |
| JP | 2005-155626 | 6/2005 |
| JP | 2009-162228 | 7/2009 |
| WO | 98/15717 | 4/1998 |

OTHER PUBLICATIONS

The First Office Action dated Jun. 2, 2016 in corresponding Chinese Application No. 201510142264.5 (with English translation).
International Search Report dated Jun. 23, 2015 in corresponding International Application No. PCT/JP2015/058172.
Written Opinion of the International Searching Authority dated Jun. 23, 2015 in corresponding International Application No. PCT/JP2015/058172.

* cited by examiner

VANE, GAS TURBINE PROVIDED WITH THE SAME, METHOD OF MANUFACTURING VANE, AND METHOD OF REMODELING VANE

TECHNICAL FIELD

The present invention relates to a vane, a gas turbine provided with the same, a method of manufacturing a vane, and a method of remodeling a vane.

Priority is claimed on Japanese Patent Application No. 2014-134418, filed on Jun. 30, 2014, the content of which is incorporated herein by reference.

BACKGROUND ART

A gas turbine is provided with a compressor that compresses atmospheric air to produce compressed air, combustors that burn fuel in the compressed air to produce a combustion gas, and a turbine that is driven by the combustion gas. The turbine has a turbine rotor rotating about an axis, a plurality of vane stages that are arranged in an axial direction in which the axis extends, and a turbine casing that rotatably covers the turbine rotor. The turbine rotor has a rotor shaft that is centered on the axis and extends in the axial direction, and a plurality of blade stages that are fixed to the rotor shaft. Each of the plurality of blade stages has a plurality of blades arranged around the axis in a circumferential direction. One of the plurality of vane stages is disposed upstream from each of the plurality of blade stages. Each of the plurality of vane stages has a plurality of vanes arranged around the axis in the circumferential direction.

Such a vane is described in, for instance, Patent Literature 1 below. This vane is provided with a vane body that extends in a radial direction with respect to the axis, an outer shroud that is formed at a radially outer side of the vane body, an inner shroud that is formed at a radially inner side of the vane body, and a support rail (or a retainer) that protrudes from the inner shroud to the radially inner side and extends in the circumferential direction.

The support rail is formed with a through-hole passing through it in the axial direction. This through-hole is formed to guide air downstream from an upstream side in the axial direction with respect to the support rail.

CITATION LIST

Patent Literature

[Patent Literature 1]
  Japanese Patent No. 2835382

SUMMARY OF INVENTION

Technical Problem

A radially outer surface of the inner shroud, i.e., a surface facing the outer shroud, is a surface coming into contact with a combustion gas. For this reason, to protect the inner shroud from the combustion gas of a high temperature, it is necessary to cool this inner shroud with a cooling medium such as air. For this purpose, the inner shroud described in Patent Literature 1 is formed with a cooling air flow path through which the air flows, and the through-hole is formed in the support rail.

In the vane described in Patent Literature 1, a portion of the inner shroud at which the retainer is provided has higher rigidity than other portions. For this reason, in the vane described in Patent Literature 1, high thermal stress occurs at the portion of the inner shroud at which the retainer is provided. Therefore, in the vane described in Patent Literature 1, it is difficult to increase the durability.

Thus, the present invention is intended to provide a technology capable of suppressing thermal stress to increase durability.

Solution to Problem

To accomplish the above object, a vane of an aspect of the present invention is disposed upstream in an axial direction, in which an axis extends, from a blade of a turbine rotor rotating about the axis, and includes: a vane body configured to extend in a radial direction with respect to the axis; an outer shroud formed at a radially outer side of the vane body; an inner shroud formed at a radially inner side of the vane body and configured to form a combustion gas flow path through which a combustion gas flows between the outer shroud and the inner shroud; and a retainer configured to protrude from the inner shroud to the radially inner side and extend in a circumferential direction centering on the axis at a position between an upstream edge of the inner shroud in the axial direction and a downstream edge of the inner shroud in the axial direction, wherein the retainer is formed with an opening that passes through the retainer in the axial direction and defines a space through which air flows, and a width of the opening in the circumferential direction is wider than a width of the vane body in the circumferential direction at a radially inner end of the vane body at a position of the retainer in the axial direction.

In this vane, the area of the opening of the retainer is greater than that of the opening of the support rail (or the retainer) in the vane described in Patent Literature 1. For this reason, the rigidity of the retainer of this vane is lower than that of the support rail (or the retainer) of the vane described in Patent Literature 1. Also, in this vane, the width of the opening of the retainer in the circumferential direction is wider than that of the vane body in the circumferential direction at the radially inner end of the vane body at the position of the retainer in the axial direction. For this reason, a position at which the retainer is provided in the inner shroud and a position at which the vane body is provided in the inner shroud can avoid overlapping each other in the circumferential direction. Therefore, in this vane, the rigidity around the inner shroud is lower than that of the vane described in Patent Literature 1. Accordingly, in this vane, it is possible to suppress thermal stress occurring at the inner shroud.

Here, in the vane, the inner shroud may have an inner shroud main body which extends in the axial and circumferential directions and whose radially outer surface comes into contact with the combustion gas, and a peripheral wall that protrudes from the inner shroud main body to the radially inner side along an outer peripheral edge of the inner shroud main body. The inner shroud may be formed with a recess recessed toward the radially outer side by the inner shroud main body and the peripheral wall. The vane may include an impingement plate which partitions an inside of the recess into a region of the radially inner side and an inner cavity that is a region of the radially outer side and in which a plurality of air holes are formed. A radially inner edge of the opening may be located at the radially inner side relative to a radially inner surface of the impingement plate, and a radially outer edge of the opening may be located at the radially outer side relative to a radially outer surface of the impingement plate.

In this vane, the portion at which the retainer is located in the axial direction within the radially inner surface of the inner shroud main body can be subjected to impingement cooling. For this reason, in this vane, it is possible to effectively cool the portion at which the retainer is located in the axial direction. Particularly, in this vane, as the width of the opening in the circumferential direction is wider than that of the vane body in the circumferential direction at the position of the retainer in the axial direction, the impingement plate can be disposed inside the opening as well. For this reason, in this vane, a range within which the impingement cooling is possible with air flowing through the plurality of air holes of the impingement plate at the position of the retainer in the axial direction can be made wider than in the vane described in Patent Literature 1. Therefore, in this vane, it is possible to further suppress the thermal stress occurring at the inner shroud.

Also, in any of the foregoing vanes, one edge of the opening which is located at one side in the circumferential direction may be located at the one side relative to an outer surface of the vane body which is located at the one side at the radially inner end of the vane body at the position of the retainer in the axial direction; and the other edge of the opening which is located at the other side in the circumferential direction may be located at the other side relative to an outer surface of the vane body which is located at the other side at the radially inner end of the vane body at the position of the retainer in the axial direction.

In this vane, overlap in the circumferential direction between the position at which the retainer is provided in the inner shroud and the position at which the vane body is provided in the inner shroud can be reliably avoided.

In any of the foregoing vanes in which the recess is formed in the inner shroud, of inner circumferential surfaces of the opening that passes through the retainer in the axial direction, the surface facing the radially outer side may be gradually inclined toward the radially outer side from the upstream side to the downstream side.

In this vane, of the inner circumferential surfaces of the opening, the surface facing the radially outer side is gradually inclined toward the radially outer side from the upstream side to the downstream side. For this reason, in this vane, it is possible to slant the impingement plate with respect to the surface of the inner shroud main body at the radially inner side to easily mount or demount the impingement plate.

In any of the foregoing vanes in which the recess is formed in the inner shroud, the impingement plate may be inserted into the opening, and may be formed by a single perforated plate that extends upstream and downstream from the retainer.

In the vane in which the impingement plate is formed by the single perforated plate, the single perforated plate forming the impingement plate may be configured in such a manner that a perforated plate located upstream and a perforated plate located downstream are joined in one body.

In this vane, since the width of the opening in the circumferential direction is enlarged compared to the opening of the retainer described in Patent Literature 1, the plurality of perforated plates can be reliably joined in one body. As a result, leakage of cooling air at a joined portion is reduced, so that a cooling effect based on the impingement cooling is improved, and an amount of cooling air is reduced.

In any of the foregoing vanes in which the recess is formed in the inner shroud, the vane may include a sealing plate that is disposed downstream from the retainer and blocks a portion of an opening of the recess downstream from the retainer.

In any of the foregoing vanes in which the recess is formed in the inner shroud, the peripheral wall of the inner shroud may have a pair of lateral peripheral walls that are opposite to each other at an interval in the circumferential direction. The one edge of the opening which is located at the one side in the circumferential direction may be located within a surface adjacent to the inner cavity of one of the pair of lateral peripheral walls which is located at the one side, and the other edge of the opening which is located at the other side in the circumferential direction may be located within a surface adjacent to the inner cavity of the other of the pair of lateral peripheral walls which is located at the other side.

In this vane, the area of the opening of the retainer becomes greater, and the rigidity of the retainer becomes lower. Moreover, the impingement plate is disposed inside the opening as well. Thereby, the range within which the impingement cooling is possible at the axial position of the retainer on the radially inner region of the inner shroud can be widened in the circumferential direction. For this reason, in this vane, the thermal stress occurring at the inner shroud can be further suppressed. Moreover, in this vane, the portion at which the retainer is located in the axial direction within the radially inner surface of the inner shroud main body can be nearly uniformly cooled almost as a whole in the circumferential direction. Therefore, in this vane, from this viewpoint, too, the thermal stress occurring at the inner shroud can be further suppressed.

In any of the foregoing vanes in which the recess is formed in the inner shroud, the inner shroud main body may be formed with a downstream end face facing downstream, and the inner shroud may be formed with a cooling air ejection hole that passes through the inner shroud from the inner cavity and is open at the downstream end face of the inner shroud main body.

In the vane in which the cooling air ejection hole is formed, the inner shroud may be formed with a plurality of cooling air ejection holes arranged in the circumferential direction.

In any of the foregoing vanes in which the recess is formed in the inner shroud, the inner shroud main body may be formed with a cooling air ejection hole that passes through the inner shroud main body from the inner cavity toward the radially outer side.

To accomplish the above object, a gas turbine of an aspect of the present invention includes a plurality of vanes, each of which is any of the foregoing vanes, the turbine rotor, a turbine casing which rotatably covers the turbine rotor and to an inner circumferential side of which the vanes are fixed, and combustors fixed to the turbine casing to produce the combustion gas.

Since this gas turbine is also provided with the vane described above, the durability of the vane can be increased.

To accomplish the above object, in an aspect of the present invention, there is provided a method of manufacturing a vane which is disposed upstream in an axial direction, in which an axis extends, from a blade of a turbine rotor rotating about the axis, and includes a vane body configured to extend in a radial direction with respect to the axis, an outer shroud formed at a radially outer side of the vane body, an inner shroud formed at a radially inner side of the vane body and configured to form a combustion gas flow path through which a combustion gas flows between the outer shroud and the inner shroud, and a retainer configured to protrude from the inner shroud to the radially inner side and extend in a circumferential direction centering on the axis at a position between an upstream edge of the inner shroud in the axial direction and a downstream edge of the inner shroud in the axial direction, the retainer being formed with an opening that passes through the retainer in the axial direction and defines a space through which air flows, the method including forming the following in one body by casting: the retainer in which the opening is formed such that a width thereof in the circumferential direction is wider than a width of the vane body in the circumferential direction at a radially inner end of the vane body at a position of the retainer in the axial direction, the vane body, the outer shroud, and the inner shroud.

To accomplish the above object, in an aspect of the present invention, there is provided a method of remodeling a vane which is disposed upstream in an axial direction, in which an axis extends, from a blade of a turbine rotor rotating about the axis, and includes a vane body configured to extend in a radial direction with respect to the axis, an outer shroud formed at a radially outer side of the vane body, an inner shroud formed at a radially inner side of the vane body and configured to form a combustion gas flow path through which a combustion gas flows between the outer shroud and the inner shroud, and a retainer configured to protrude from the inner shroud to the radially inner side and extend in a circumferential direction centering on the axis at a position between an upstream edge of the inner shroud in the axial direction and a downstream edge of the inner shroud in the axial direction, the retainer being formed with an opening that passes through the retainer in the axial direction and defines a space through which air flows, the method including processing the retainer such that a width of the opening in the circumferential direction becomes wider than a width of the vane body in the circumferential direction at a radially inner end of the vane body at a position of the retainer in the axial direction.

Here, in the method of remodeling a vane, prior to processing the retainer, the width of the opening in the circumferential direction may be narrower than the width of the vane body in the circumferential direction at the radially inner end of the vane body at the position of the retainer in the axial direction, and during processing of the retainer, the retainer may be ground to enlarge the opening.

Advantageous Effects of Invention

In an aspect of the present invention, it is possible to suppress thermal stress occurring at an inner shroud of a vane. Therefore, according to the aspect of the present invention, it is possible to increase the durability of the vane.

DESCRIPTION OF EMBODIMENTS

Hereinafter, an embodiment of a vane according to the present invention, an embodiment of a gas turbine provided with the same, and various modifications of the vane will be described in detail with reference to the drawings.

Embodiments

The embodiment of the vane according to the present invention and the embodiment of the gas turbine provided with the same will be described with reference to FIGS. 1 to 12.

Figure 1:
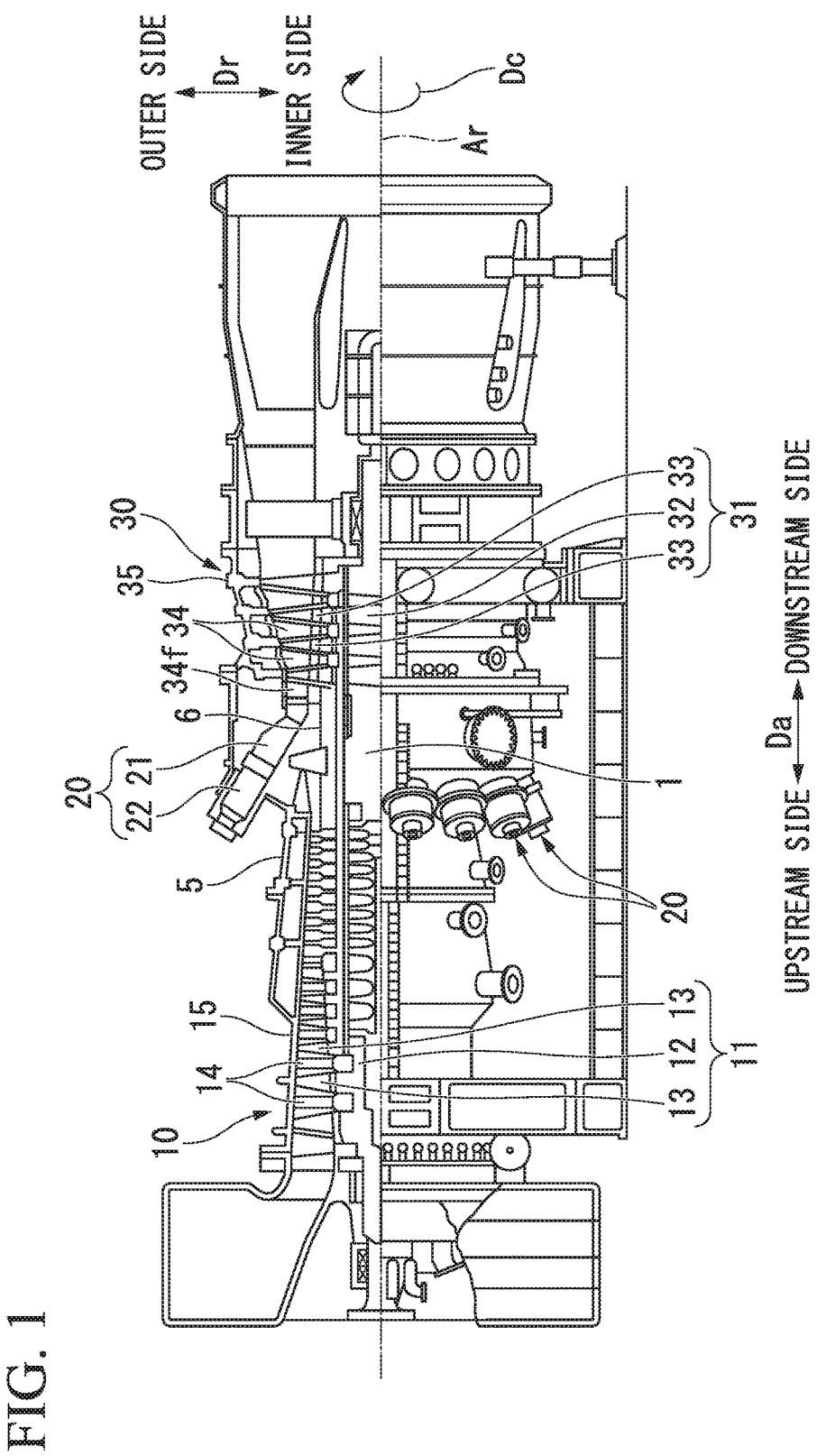
FIG. 1 is a full side view in which major parts of a gas turbine are cut out in an embodiment according to the present invention.

As illustrated in FIG. 1, the gas turbine of the present embodiment is provided with a compressor 10 that compresses air, combustors 20 that burn fuel in the air compressed by the compressor 10 to generate a combustion gas, and a turbine 30 that is driven by the combustion gas.

Figure 2:
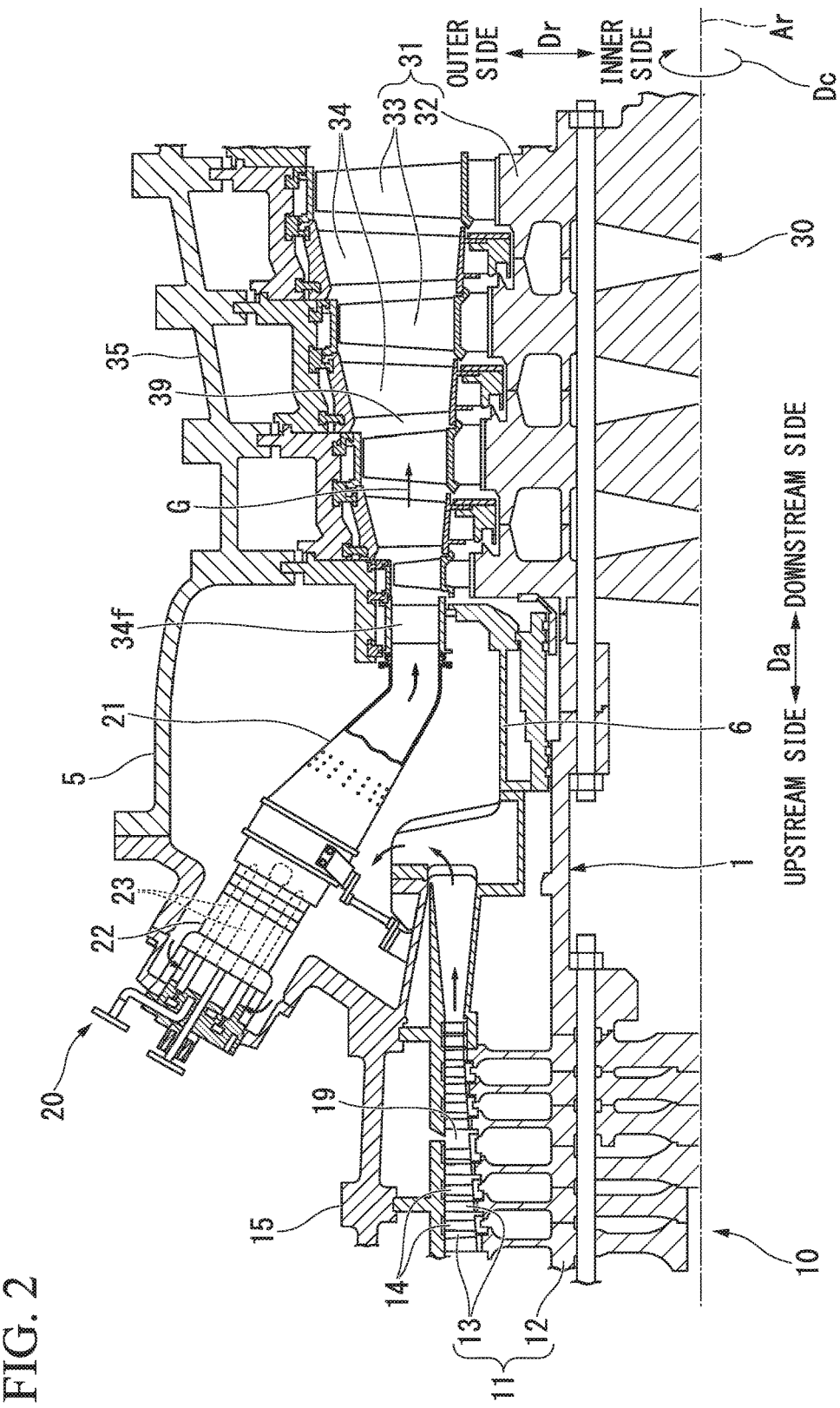
FIG. 2 is a sectional view of the major parts of the gas turbine in the embodiment according to the present invention.

As illustrated in FIGS. 1 and 2, the compressor 10 has a compressor rotor 11 rotating about an axis Ar, a compressor casing 15 that rotatably covers the compressor rotor 11, and a plurality of vane stages 14. Hereinafter, a direction in which the axis Ar extends is defined as an axial direction Da, one side of this axial direction Da is defined as an upstream side, and the other side of this axial direction Da is defined as a downstream side. Also, a circumferential direction centering on this axis Ar is simply defined as a circumferential direction Dc, and a direction perpendicular to the axis Ar is defined as a radial direction Dr. The compressor rotor 11 has a rotor shaft 12 that is centered on the axis Ar and extends in the axial direction Da, and a plurality of blade stages 13 that are mounted on the rotor shaft 12. The plurality of blade stages 13 are arranged in the axial direction Da. Each of the plurality of blade stages 13 is made up of a plurality of blades arranged in the circumferential direction Dc. The vane stages 14 are disposed respectively upstream from the plurality of blade stages 13. The vane stages 14 are provided inside the compressor casing 15. Each of the plurality of vane stages 14 is made up of a plurality of vanes arranged in the circumferential direction Dc. An annular space within a region which is between a radially outer circumferential side of the rotor shaft 12 and a radially inner circumferential side of the compressor casing 15 and within which the vane stages 14 and the blade stages 13 are disposed in the axial direction Da forms an air compression flow path 19 in which air is compressed while flowing.

Figure 3:
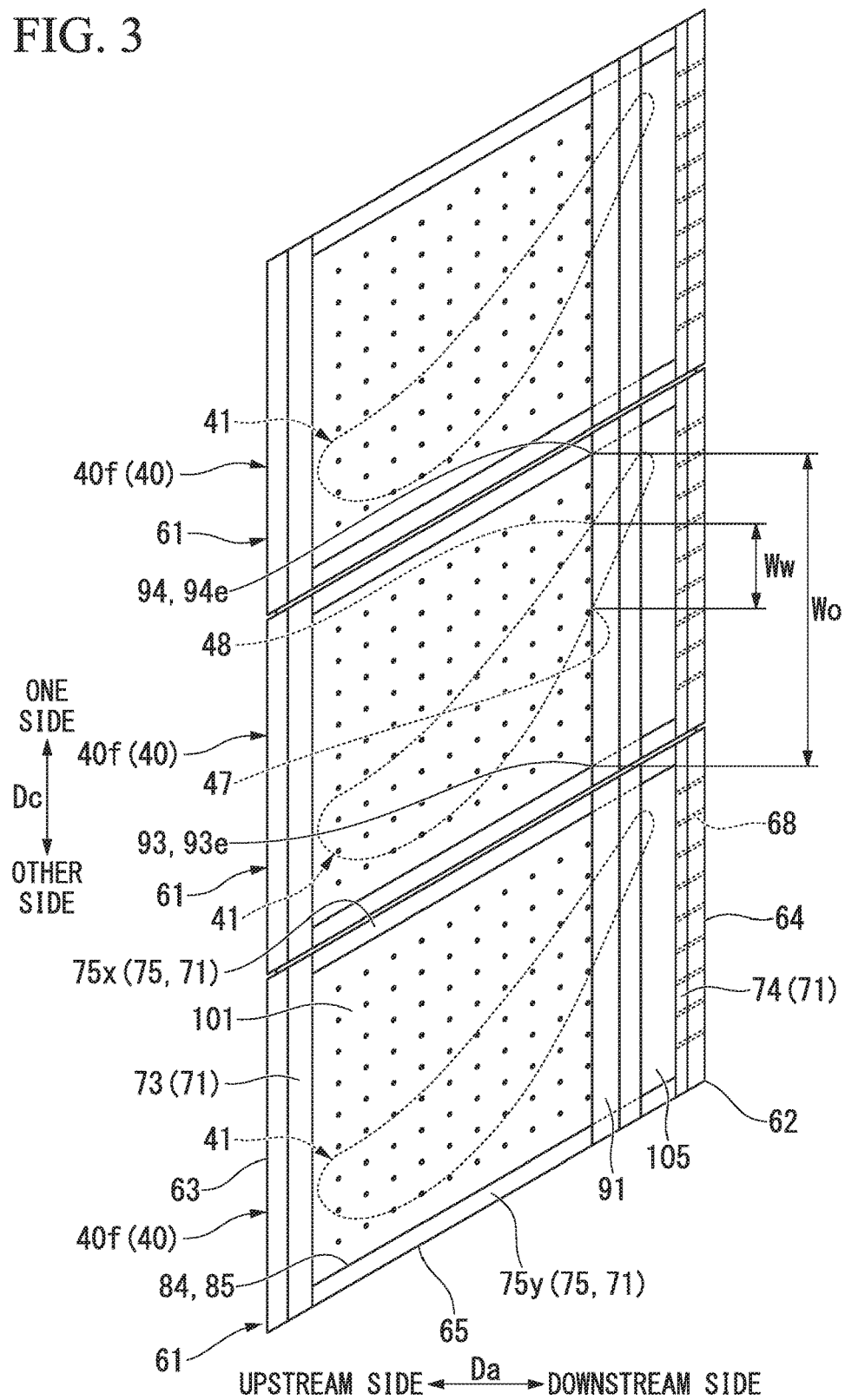
FIG. 3 is a view of a part of a vane stage in the embodiment according to the present invention when viewed from a radially inner side.

The turbine 30 has a turbine rotor 31 that rotates about the axis Ar, a turbine casing 35 that rotatably covers the turbine rotor 31, and a plurality of vane stages 34. The combustors 20 are fixed to an upstream portion of the turbine casing 35. The turbine rotor 31 has a rotor shaft 32 that is centered on the axis Ar and extends in the axial direction Da, and a plurality of blade stages 33 that are mounted on the rotor shaft 32. The plurality of blade stages 33 are arranged in the axial direction Da. Each of the plurality of blade stages 33 is made up of a plurality of blades arranged in the circumferential direction Dc. The vane stages 34 are disposed respectively upstream from the plurality of blade stages 33. The vane stages 34 are provided inside the turbine casing 35. As illustrated in FIG. 3, each of the vane stages 34 is made up of a plurality of vanes 40 arranged in the circumferential direction Dc. An annular space within a region which is between an outer circumferential side of the rotor shaft 32 and an inner circumferential side of the turbine casing 35 and within which the vane stages 34 and the blade stages 33 are disposed in the axial direction Da forms a combustion gas flow path 39 through which a combustion gas G flows from the combustors 20.

Each of the combustors 20 has a combustion liner (or a transition piece) 21 that sends the combustion gas G of high temperature and pressure into the combustion gas flow path 39 of the turbine 30, and a fuel injector 22 that injects fuel into the combustion liner 21 along with air. The fuel injector 22 has a plurality of nozzles 23 injecting the fuel into the combustion liner 21. The fuel is supplied to each of the nozzles 23 from a fuel supply source via a fuel line.

The compressor rotor 11 and the turbine rotor 31 are located on the same axis Ar, and are interconnected to form a gas turbine rotor 1. Also, the compressor casing 15 and the turbine casing 35 are interconnected to form a gas turbine casing 5. The gas turbine is further provided with an inner cover 6 that covers an outer circumferential side of the gas turbine rotor 1 at an inner circumferential side of the gas turbine casing 5 between the air compression flow path 19 of the compressor 10 and the combustion gas flow path 39 of the turbine 30 in the axial direction Da. The inner cover 6 extends up to the position of a first vane stage 34f located furthest upstream in the axial direction Da among the vane stages 34 of the turbine 30.

Figure 4:
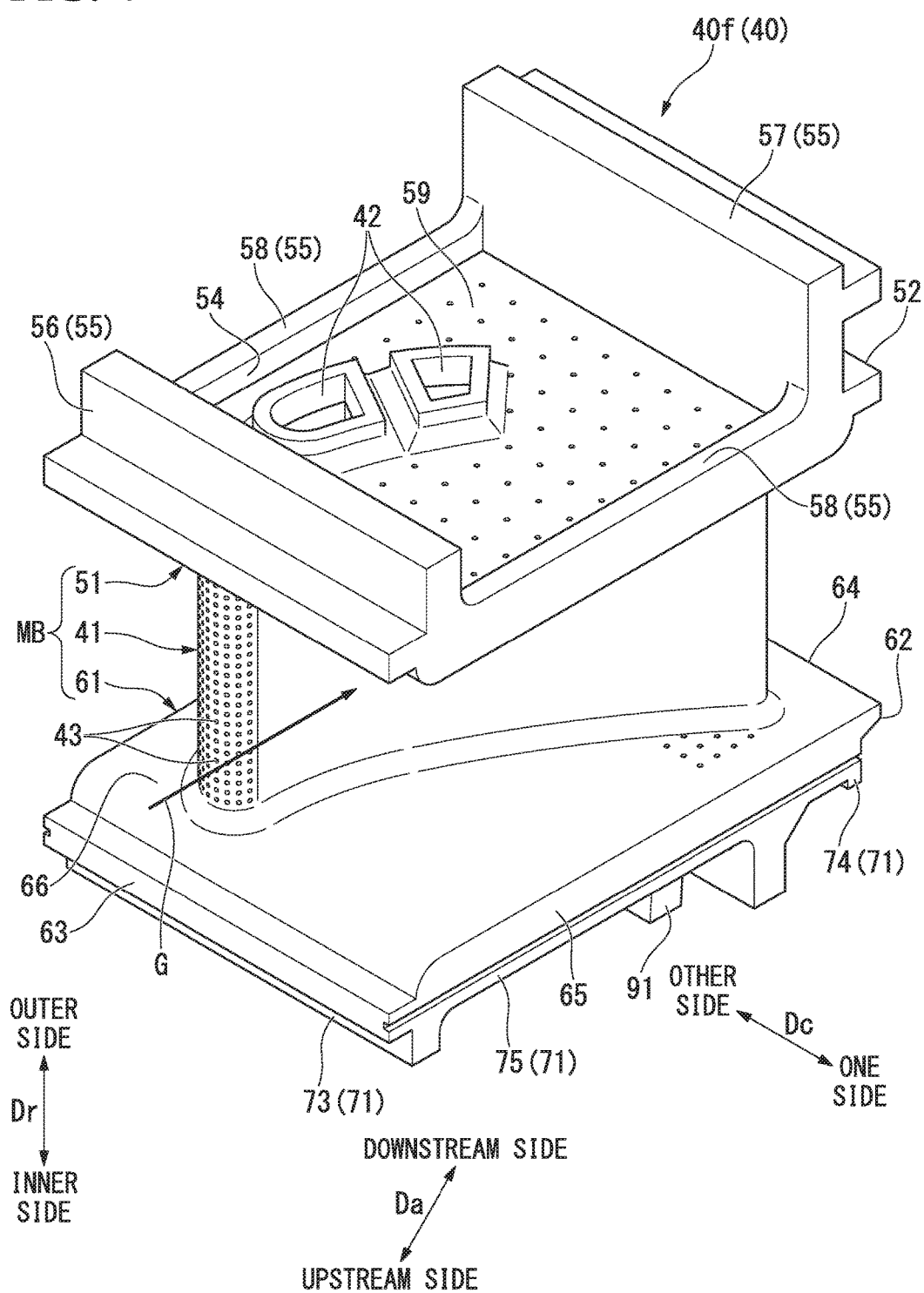
FIG. 4 is a perspective view of a vane in the embodiment according to the present invention when viewed from a radially outer side.

As illustrated in FIG. 4, each of the plurality of vanes 40 constituting each of the vane stages 34 of the turbine 30 has a vane body 41 extending in the radial direction Dr, an outer shroud 51 formed at a radially outer side of the vane body 41, and an inner shroud 61 formed at a radially inner side of the vane body 41. A space between the inner shroud 61 and the outer shroud 51 forms a part of the aforementioned combustion gas flow path 39. Each of the plurality of vanes 40f constituting the first vane stage 34f located furthest upstream among the vane stages 34 further includes a retainer 91 that protrudes from the inner shroud 61 to the radially inner side and extends in the circumferential direction.

The vane body 41 is formed with cooling air main flow channels 42 which extend in the radial direction Dr and through which cooling air flows, and a plurality of cooling air ejection holes 43 that pass through the vane body 41 from the cooling air main flow channels 42 toward the upstream side and are open at a leading edge of the vane body 41. Further, the vane body 41 may be formed with a plurality of cooling air ejection holes that pass through the vane body 41 from the cooling air main flow channels 42 toward the downstream side and are open at a trailing edge of the vane body 41.

The outer shroud 51 has a plate-like outer shroud main body 52 that extends in the axial direction Da and the circumferential direction Dc, and a peripheral wall 55 protruding along an outer peripheral edge of the outer shroud main body 52 from the outer shroud main body 52 to the radially outer side. The peripheral wall 55 has upstream and downstream peripheral walls 56 and 57 that are opposite to each other in the axial direction Da, and a pair of lateral peripheral walls 58 that are opposite to each other in the circumferential direction Dc. Both of the upstream peripheral wall 56 and the downstream peripheral wall 57 protrude further to the radially outer side with respect to the outer shroud main body 52 than the pair of lateral peripheral walls 58, and form hook parts. The upstream and downstream peripheral walls 56 and 57 forming the hook parts play a role in mounting the vanes 40 on the inner circumferential side of the turbine casing 35. A recess 54 recessed toward the radially inner side is formed in the outer shroud 51 by the outer shroud main body 52 and the peripheral wall 55. The cooling air main flow channels 42 of the vane body 41 are open within the recess 54. Therefore, air from the radially outer side of the outer shroud 51 flows into the cooling air main flow channels 42 of the vane body 41. The air flowing into the cooling air main flow channels 42 is ejected from a plurality of cooling air ejection ports into the combustion gas flow path 39.

The vane 40 is further provided with an impingement plate 59 that partitions the recess 54 of the outer shroud 51 into a region of the radially inner side and a region of the radially outer side. The impingement plate 59 is formed with a plurality of air holes passing therethrough in the radial direction Dr.

Figure 5:
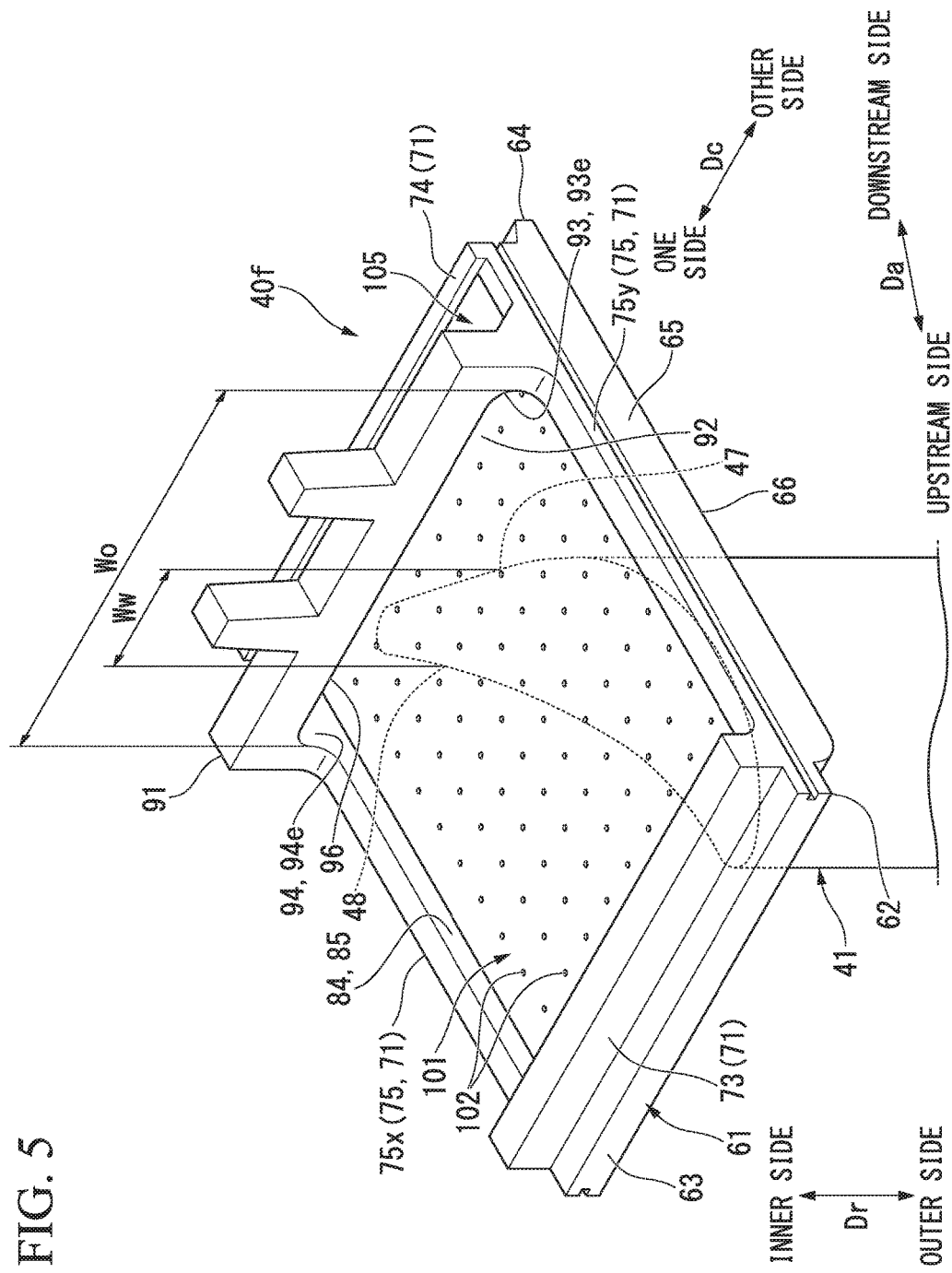
FIG. 5 is a perspective view of major parts of the vane in the embodiment according to the present invention when viewed from the radially inner side.

As illustrated in FIGS. 4 and 5, the inner shroud 61 has a plate-like inner shroud main body 62 that extends in the axial direction Da and the circumferential direction Dc, and a peripheral wall 71 protruding along an outer peripheral edge of the inner shroud main body 62 from the inner shroud main body 62 to the radially inner side.

A radially outer surface of the inner shroud main body 62 forms a gas path face 66 coming into contact with the combustion gas. The inner shroud main body 62 is formed with upstream and downstream end faces 63 and 64 that are opposite to each other in the axial direction Da, and a pair of lateral end faces 65 that are opposite to each other in the circumferential direction Dc. As illustrated in FIG. 3, both of the pair of lateral end faces 65 are gradually inclined from the upstream side to the downstream side to be located at one side in the circumferential direction Dc. For this reason, when viewed from the radially inner side to the radially outer side, the inner shroud main body 62 is formed in a parallelogram shape. The peripheral wall 71 has upstream and downstream peripheral walls 73 and 74 that are opposite to each other in the axial direction Da, and a pair of lateral peripheral walls 75 that are opposite to each other in the circumferential direction Dc. The upstream peripheral wall 73 extends along the upstream end face 63 in the circumferential direction Dc at a position that is slightly downstream from the upstream end face 63 of the inner shroud main body 62. The downstream peripheral wall 74 extends along the downstream end face 64 in the circumferential direction Dc at a position that is slightly upstream from the downstream end face 64 of the inner shroud main body 62. The lateral peripheral walls 75 are formed along the lateral end faces 65 of the inner shroud main body 62 between the upstream peripheral wall 73 and the downstream peripheral wall 74. A recess 84 recessed toward the radially outer side is formed in the inner shroud 61 by the inner shroud main body 62 and the peripheral wall 71. The cooling air main flow channels 42 of the vane body 41 are open within the recess 54 of the outer shroud 51 as described above and are also open within the recess 84 of the inner shroud 61.

As illustrated in FIGS. 3 to 6, the retainer 91 is formed at a position within a region of the vane body 41 in the axial direction Da by extending from one of the pair of lateral peripheral walls 75 of the inner shroud 61 in the circumferential direction Dc to the other lateral peripheral wall 75. The retainer 91 protrudes to the radially inner side relative to all of the upstream peripheral wall 73, the downstream peripheral wall 74, and the lateral peripheral walls 75 that constitute the peripheral wall 71. The retainer 91 serves to come into contact with a radially outer end 6a (see FIG. 6) of the inner cover 6 at the downstream side to support a radially inner portion of the vane 40f on the radially outer end 6a (see FIG. 6) of the inner cover 6 at the downstream side.

Figure 7:
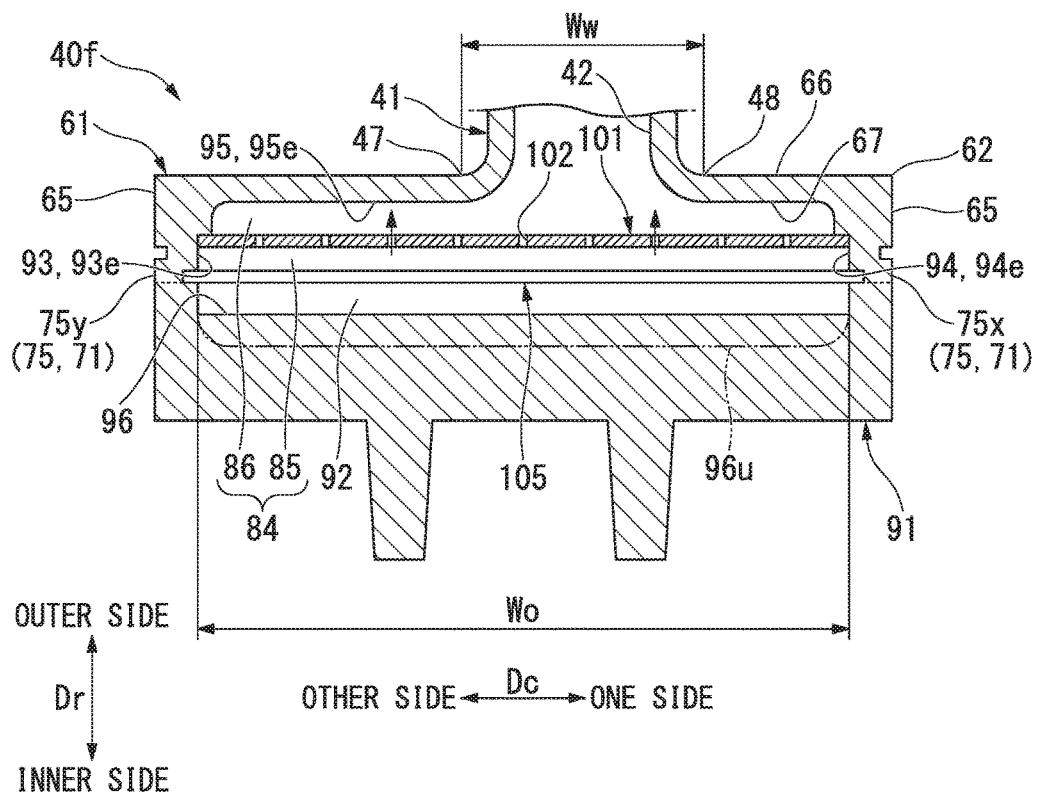
FIG. 7 is a sectional view taken along line VII-VII in FIG. 6.
Figure 8:
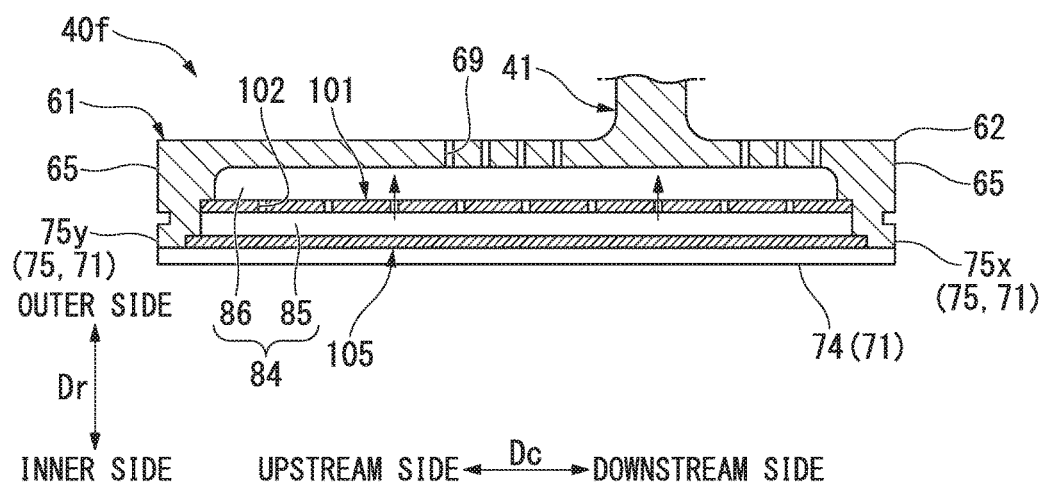
FIG. 8 is a sectional view taken along line VIII-VIII in FIG. 6.

The retainer 91 is formed with an opening 92 (hereinafter referred to as a retainer opening 92) passing through it in the axial direction Da to define a space through which air flows. As illustrated in FIGS. 5 and 7, when viewed from the axial direction Da, the retainer opening 92 is formed in a rectangular shape that is long in the circumferential direction Dc. Among inner circumferential surfaces of the retainer opening 92, a first inner circumferential surface 93 facing one side of the circumferential direction Dc is located in a surface adjacent to the recess 84 of one lateral peripheral wall 75y of the pair of lateral peripheral walls 75 which is located at the other side in the circumferential direction Dc, and a second inner circumferential surface 94 facing the other side in the circumferential direction Dc is located in a surface adjacent to the recess 84 of the other lateral peripheral wall 75x of the pair of lateral peripheral walls 75 which is located at the one side in the circumferential direction Dc. In other words, an edge 94e of the retainer opening 92 at the one side in the circumferential direction Dc is located in the surface adjacent to the recess 84 of one of the pair of lateral peripheral walls 75, i.e., the lateral peripheral wall 75x located at the one side, and an edge 93e of the retainer opening 92 at the other side in the circumferential direction Dc is located in the surface adjacent to the recess 84 of the other of the pair of lateral peripheral walls 75, i.e., the lateral peripheral wall 75y located at the other side. Also, the edge 94e of the retainer opening 92 at the one side in the circumferential direction Dc is located at the one side relative to an outer surface 48 at the one side of the vane body 41 at a radially inner end of the vane body 41 at a position of the retainer 91 in the axial direction Da. Further, the edge 93e of the retainer opening 92 at the other side in the circumferential direction Dc is located at the other side relative to an outer surface 47 at the other side of the vane body 41 at the radially inner end of the vane body 41 at the position of the retainer 91 in the axial direction Da. That is, a width Wo of the retainer opening 92 in the circumferential direction Dc is equal to a width of the recess 84 of the inner shroud 61 in the circumferential direction Dc, and is wider than a width Ww of the vane body 41 in the circumferential direction Dc at the radially inner end of the vane body 41 at the position of the retainer 91 in the axial direction Da.

Figure 6:
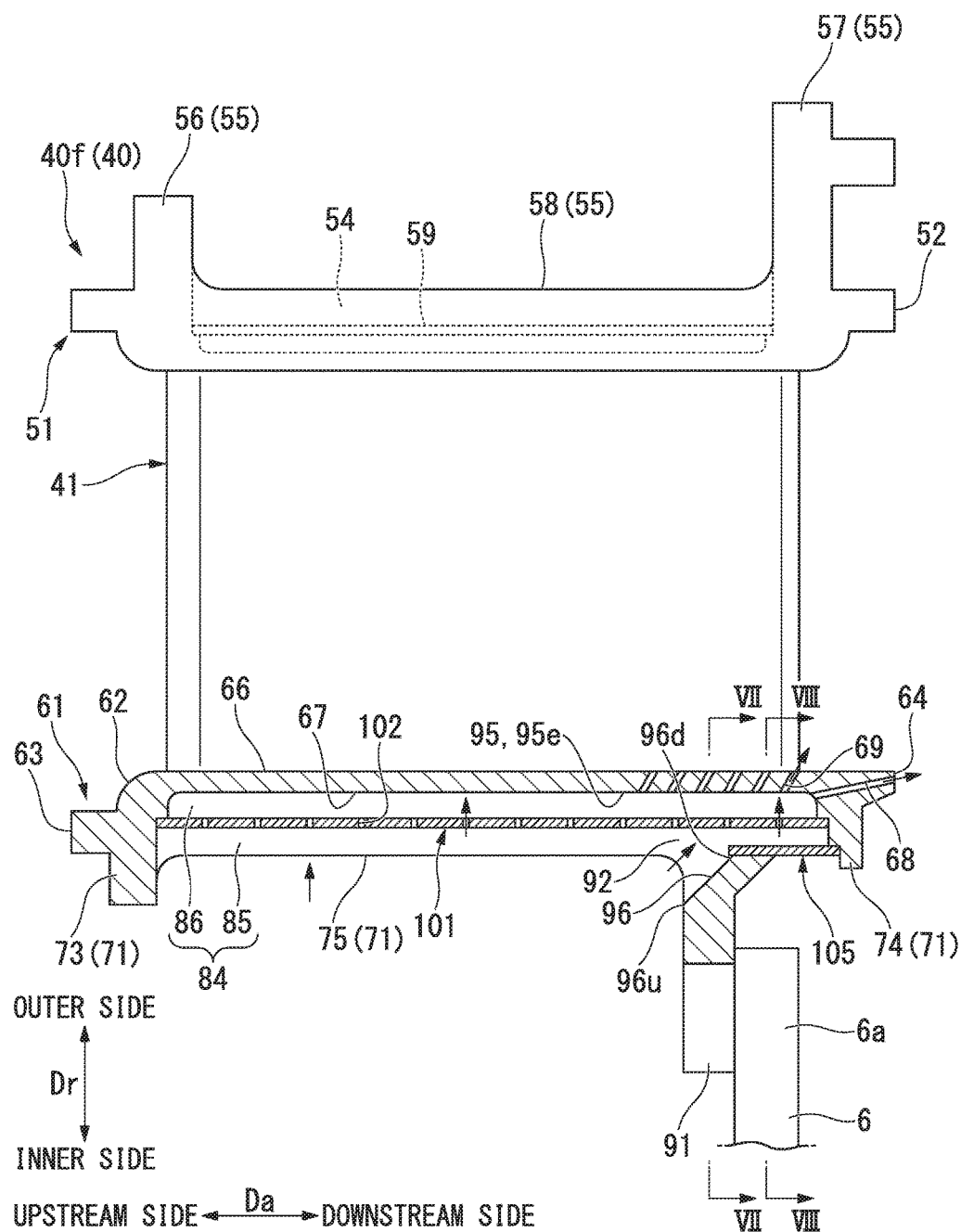
FIG. 6 is a side view in which major parts of the vane are cut out in the embodiment according to the present invention.

As illustrated in FIGS. 6 and 7, among the inner circumferential surfaces of the retainer opening 92, a third inner circumferential surface 95 facing the radially inner side is included within a radially inner surface 67 of the inner shroud main body 62, and is located at the same position in the radial direction Dr as this radially inner surface 67. In other words, a radially outer edge 95e of the retainer opening 92 is included within the radially inner surface 67 of the inner shroud main body 62, and is located at the same position in the radial direction Dr as the radially inner surface 67. Among the inner circumferential surfaces of the retainer opening 92, a fourth inner circumferential surface 96 facing the radially outer side is gradually inclined from the upstream side to the downstream side to face the radially outer side. A downstream edge 96d of the fourth inner circumferential surface 96 is located at a position in the radial direction Dr which is approximately the same as a position of radially inner surfaces of the lateral peripheral walls 75. Therefore, an upstream edge 96u of the fourth inner circumferential surface 96 is located at the radially inner side relative to the position of the radially inner surfaces of the lateral peripheral walls 75.

The plurality of vanes 40f constituting the first vane stage 34f are each provided with an impingement plate 101 that partitions the inside of the aforementioned recess 84 into a region 85 of the radially inner side and an inner cavity 86 that is a region of the radially outer side, and a sealing plate 105 that blocks a portion of the opening of the recess 84 downstream from the retainer 91. The outer shroud 51, the vane body 41, the inner shroud 61, and the retainer 91 are formed in one body, and thereby a vane main body MB (see FIG. 4) is formed. Therefore, the vane 40f of the present embodiment is constituted of the impingement plate 101, the sealing plate 105, the vane main body MB, and the impingement plate 59 partitioning the recess 54 of the outer shroud 51.

The impingement plate 101 is inserted into the retainer opening 92 near the middle of the recess 84 in the radial direction Dr. Accordingly, the radially outer edge of the retainer opening 92 is located at the radially outer side relative to the radially outer surface of the impingement plate 101, and the radially inner edge of the retainer opening 92 is located at the radially inner side relative to the radially inner surface of the impingement plate 101. An upstream edge of the impingement plate 101 abuts the upstream peripheral wall 73 of the inner shroud 61, and a downstream edge of the impingement plate 101 abuts the downstream peripheral wall 74 of the inner shroud 61. Lateral edges of the impingement plate 101 which are ends in the circumferential direction Dc abut the lateral peripheral walls 75 of the inner shroud 61. The impingement plate 101 is formed with a plurality of air holes passing through it from the radially inner side toward the radially outer side.

As illustrated in FIGS. 5 to 8, the sealing plate 105 is located downstream from the retainer 91, at the radially inner side relative to the impingement plate 101. An upstream edge of the sealing plate 105 abuts the fourth inner circumferential surface 96 of the retainer opening 92, and a downstream edge of the sealing plate 105 abuts the downstream peripheral wall 74 of the inner shroud 61. Lateral edges of the sealing plate 105 which are ends in the circumferential direction Dc abut the lateral peripheral walls 75 of the inner shroud 61.

The inner shroud 61 is formed with a plurality of first cooling air ejection holes 68 (see FIG. 6) that pass through the inner shroud 61 from the inner cavity 86 toward the downstream and are open at the downstream end face 64 of the inner shroud main body 62. The plurality of first cooling air ejection holes 68 are arranged in the circumferential direction Dc (see FIG. 3). The inner shroud main body 62 is also formed with a plurality of second cooling air ejection holes 69 (see FIG. 6) that pass through the inner shroud main body 62 from the inner cavity 86 toward the radially outer side and are open at the gas path face 66 of the inner shroud main body 62.

An operation of the gas turbine described above and a function of the vane 40f will be described.

The compressor 10 suctions open air, and compresses it to produce compressed air. A part of the compressed air which the compressor 10 has produced is ejected into the combustion liner 21 via the fuel injector 22 of the combustors 20. Fuel from the fuel injector 22 is injected into the combustion liner 21. This fuel is burnt in the compressed air inside the combustion liner 21. As a result of the combustion, a combustion gas G is produced. This combustion gas G flows from the combustion liner 21 into the combustion gas flow path 39 of the turbine 30. As the combustion gas G flows through the combustion gas flow path 39, the turbine rotor 31 is rotated.

The vane 40f forming a part of the combustion gas flow path 39 is exposed to the combustion gas of a high temperature. For this reason, as described above, the vanes 40f of the present embodiment are formed with flow channels and holes through which cooling air flows.

A part of the compressed air produced by the compressor 10 flows from the radially outer side of the vane 40f into the recess 54 of the outer shroud 51. A part of the compressed air which flows into the recess 54 of the outer shroud 51 flows into an outer cavity between the impingement plate 59 and the outer shroud main body 52 via the plurality of air holes of the impingement plate 59. In this process, the compressed air collides with the outer shroud main body 52 to carry out impingement cooling on the outer shroud main body. Further, the remaining part of the compressed air which flows into the recess 54 of the outer shroud 51 flows into the cooling air main flow channels 42 of the vane body 41 to cool the vane body 41 in a process in which it is ejected from the plurality of cooling air ejection holes 43 into the combustion gas flow path 39 and in a process in which it is ejected from the plurality of cooling air ejection holes 43 again.

Another part of the compressed air which the compressor 10 has produced flows from the radially inner side of the vane 40f into the recess 84 of the inner shroud 61. To be more accurate, the compressed air flows from a portion of the opening of the recess 84 of the inner shroud 61 upstream from the retainer 91 into the region 85 of the radially inner side in the recess 84. Further, the compressed air also flows from the retainer opening 92 into the region 85 of the radially inner side in the recess 84.

Most of the compressed air which has flowed from the portion of the opening of the recess 84 of the inner shroud 61 upstream from the retainer 91 into the region 85 of the radially inner side in the recess 84 flows into the inner cavity 86 via some of the plurality of air holes 102 of the impingement plate 101 upstream from the retainer 91. Most of the compressed air flowing into the inner cavity 86 collides with a portion of the inner shroud main body 62 upstream from the retainer 91 to carry out impingement cooling on this portion. Also, most of the compressed air which has flowed from the retainer opening 92 into the region 85 of the radially inner side in the recess 84 flows into the inner cavity 86 via some of the plurality of air holes 102 of the impingement plate 101 downstream from the retainer 91. Most of the compressed air flowing into the inner cavity 86 collides with a portion of the inner shroud main body 62 downstream from the retainer 91 to carry out impingement cooling on this portion.

A part of the compressed air flowing into the inner cavity 86 flows through the plurality of first cooling air ejection holes 68, and is ejected from the downstream end face 64 of the inner shroud main body 62 into the combustion gas outside the inner shroud 61. This compressed air cools a downstream portion of the inner shroud main body 62 in a process in which it flows through the plurality of first cooling air ejection holes 68.

Another part of the compressed air flowing into the inner cavity 86 flows through the plurality of second cooling air ejection holes 69, and is ejected from the gas path face 66 of the inner shroud main body 62 to the combustion gas flow path 39. This compressed air cools the inner shroud main body 62 in a process in which it flows through the plurality of second cooling air ejection holes 69. Further, this compressed air is ejected to the inner shroud main body 62 along the gas path face 66, thereby carrying out film cooling on this gas path face 66.

Here, a vane 40c of a comparative example will be described with reference to FIGS. 9 and 10.

A retainer 91c of the vane 40c of the comparative example is fundamentally different from the retainer 91 of the vane 40f of the present embodiment. The retainer 91c of the vane 40c of the comparative example is formed to protrude from a radially inner surface of an inner shroud main body 62c toward the radially inner side. A retainer opening 92c formed in this retainer 91c is formed at a position between an impingement plate 101cb and the sealing plate 105 in the radial direction Dr. As illustrated in FIG. 10, when viewed from the axial direction Da, the retainer opening 92c is formed in a rectangular shape. A length of the retainer opening 92c in the radial direction Dr is smaller than an interval length between the impingement plate 101cb and the sealing plate 105 in the radial direction Dr. For this reason, a width of the retainer opening 92c in the radial direction Dr is much narrower than that of the retainer opening 92 of the present embodiment in the radial direction Dr. Also, an inner length Woc, i.e., a width, of the retainer opening 92c in the circumferential direction Dc is smaller than the width Ww of the vane body 41 in the circumferential direction Dc at the radially inner end of the vane body 41 at a position of the retainer 91c in the axial direction Da. That is, an area of the retainer opening 92c of the comparative example is much smaller than that of the retainer opening 92 of the present embodiment.

In this way, since the area of the retainer opening 92c of the comparative example is much smaller than that of the retainer opening 92 of the present embodiment, the rigidity of the retainer 91c of the comparative example is higher than that of the retainer 91 of the present embodiment. Furthermore, in the comparative example, a position at which the retainer 91c is provided in the inner shroud main body 62c and a position at which the vane body 41 is provided in the inner shroud main body 62c overlap each other in the circumferential direction Dc. In the vane 40c of the comparative example, therefore, the rigidity around the inner shroud main body 62c, particularly, the rigidity around the position at which the retainer 91c is provided in the inner shroud main body 62c, is increased. For this reason, in the comparative example, if temperature distribution occurs in the inner shroud main body 62c, high thermal stress occurs around the position at which the retainer 91c is provided in an inner shroud 61c.

On the other hand, since the area of the retainer opening 92 of the present embodiment is by contrast much greater than that of the retainer opening 92c of the comparative example, the rigidity of the retainer 91 of the present embodiment is lower than that of the retainer 91c of the comparative example. Furthermore, in the present embodiment, a position at which the retainer 91 is provided in the inner shroud 61 and a position at which the vane body 41 is provided in the inner shroud 61 are different from each other in the circumferential direction Dc. Therefore, in the vane 40f of the present embodiment, the rigidity around the inner shroud main body 62 is lower than that of the comparative example. For this reason, in the present embodiment, even if temperature distribution occurs in the inner shroud main body 62, the thermal stress occurring at the inner shroud main body 62 can be suppressed.

Figure 9:
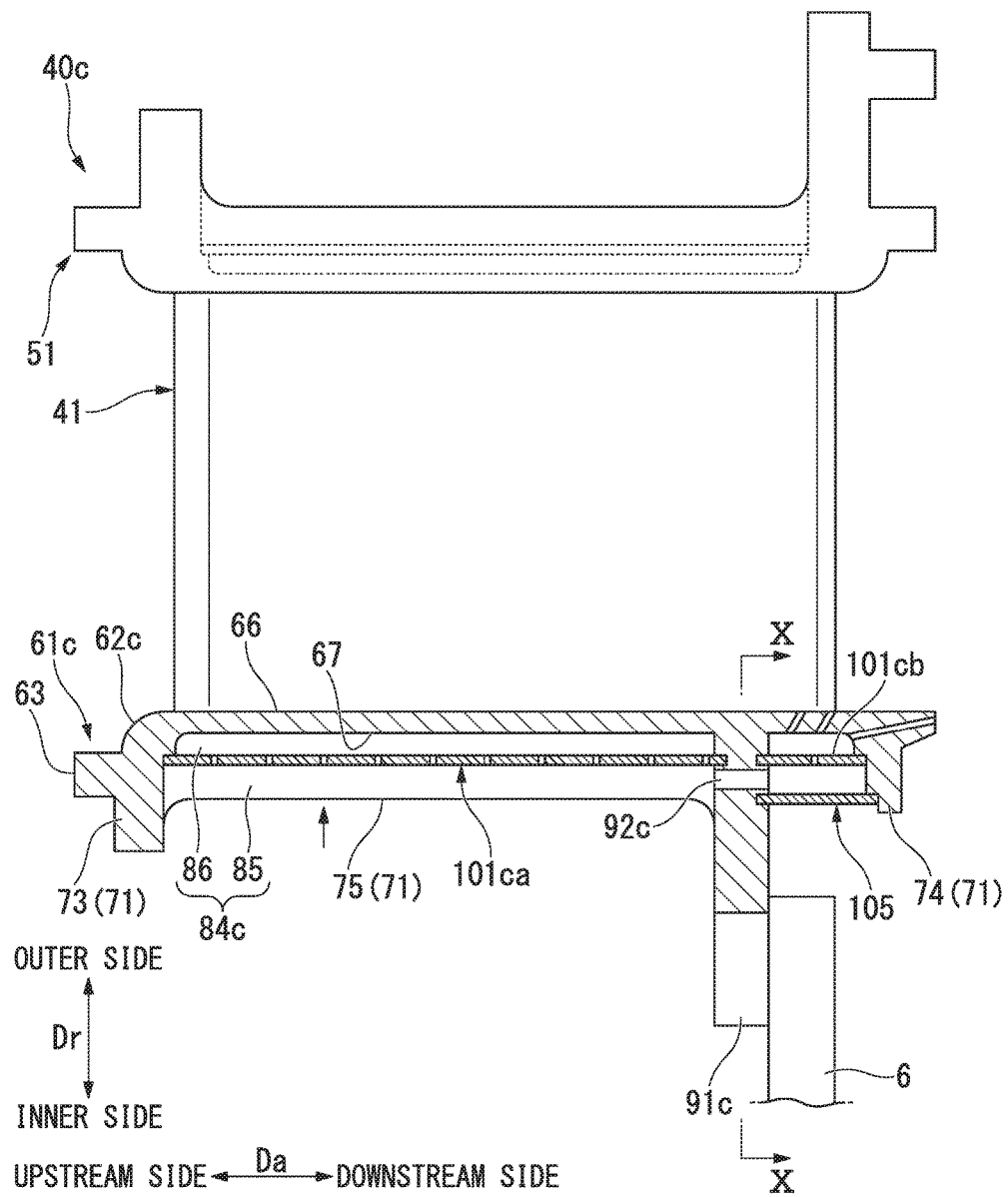
FIG. 9 is a side view in which major parts of the vane are cut out in a comparative example according to the present invention.
Figure 10:
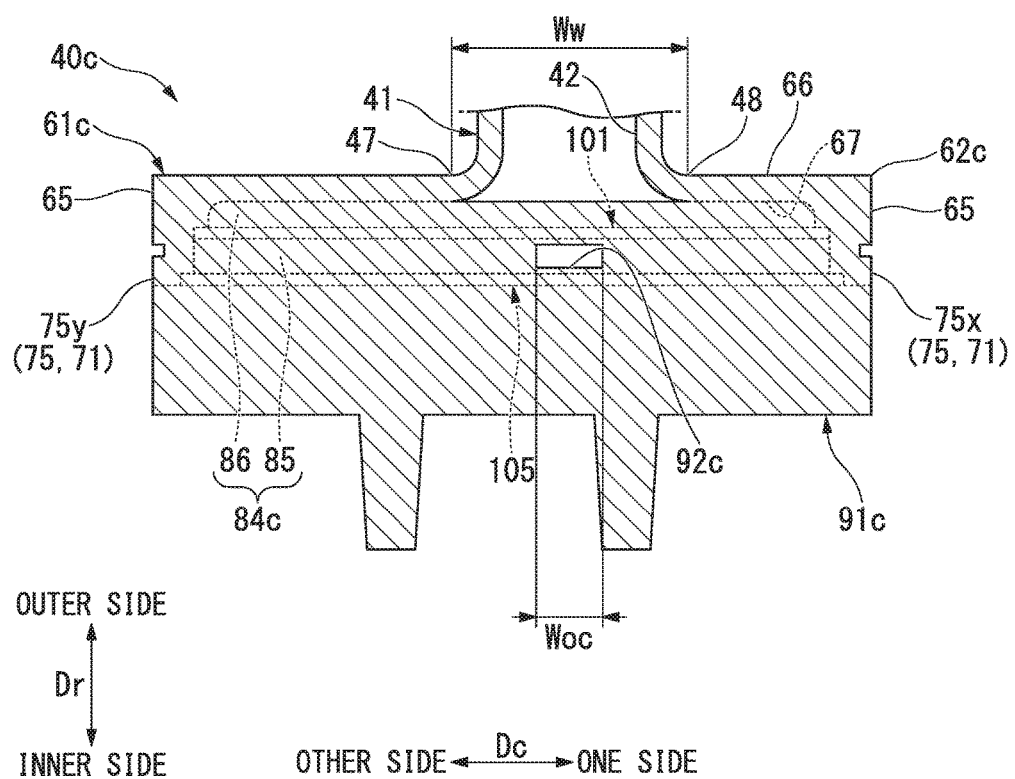
FIG. 10 is a sectional view taken along line X-X in FIG. 9.

As illustrated in FIGS. 9 and 10, the retainer 91c illustrated in the comparative example is directed from the inner shroud main body 62c toward the radially inner side and is provided over the full width of the inner shroud main body 62c in the circumferential direction Dc. For this reason, the radially inner surface 67 of the inner shroud main body 62c at the position of the retainer 91c in the axial direction Da is a region on which the impingement cooling is impossible over the full width of the radially inner surface 67 in the circumferential direction Dc. On the other hand, the retainer opening 92 formed in the retainer 91 of the present embodiment is formed in the circumferential direction Dc to be wider than the width Ww of the vane body 41 in the circumferential direction Dc at the radially inner end of the vane body 41 at the position of the retainer 91 in the axial direction Da, and is formed from the position flush with the radially inner surface 67 of the inner shroud main body 62 in the radial direction Dr to the position of the radially inner surfaces of the lateral peripheral walls 75 (downstream edge 96d). For this reason, in the present embodiment, the impingement plate 101 can be disposed almost throughout an area in the circumferential direction Dc at the portion at which the retainer 91 is located in the axial direction Da in the radially inner surface 67 of the inner shroud main body 62. Therefore, the impingement cooling can be performed on the radially inner surface 67 of the inner shroud main body 62 over the full width in the circumferential direction Dc, including the portion at which the retainer 91 is located in the axial direction Da. Accordingly, the inner shroud main body 62 of the present embodiment is almost entirely cooled by compressed air more uniformly than that of the comparative example, including the portion at which the retainer 91 is located in the axial direction Da. As a result, a temperature difference in the inner shroud main body 62 of the present embodiment can be made smaller than that of the comparative example. Thus, in the present embodiment, from this viewpoint, too, the thermal stress occurring at the inner shroud main body 62 can be suppressed.

As described above, in the present embodiment, in comparison with the comparative example, the rigidity around the inner shroud main body 62 is low, and the temperature difference in the inner shroud main body 62 is small. Thus, in comparison with the comparative example, the thermal stress occurring at the inner shroud main body 62 can be reduced. Therefore, in the present embodiment, the durability of the vane 40f can be increased, compared to the comparative example.

Also, in the comparative example, the inside of the recess 84c of the inner shroud 61c is partitioned into the upstream side and the downstream side by the retainer 91c. Thus, as the impingement plates 101ca and 101cb that partition the recess 84c into the region 85 of the radially inner side and the inner cavity 86 of the radially outer side, the upstream impingement plate 101ca that partitions the portion in the recess 84c upstream from the retainer 91c into the region 85 of the radially inner side and the inner cavity 86 of the radially outer side, and the downstream impingement plate 101cb that partitions the portion in the recess 84c downstream from the retainer 91c into the region 85 of the radially inner side and the inner cavity 86 of the radially outer side are required.

On the other hand, in the present embodiment, the width Wo of the retainer opening 92 in the circumferential direction Dc is matched with the width of the recess 84 of the inner shroud 61 in the circumferential direction Dc. Thus, even if the impingement plate 101 is formed of a single perforated plate, this single perforated plate is inserted into the retainer opening 92, and thereby the recess 84 can be partitioned into the region 85 of the radially inner side and the inner cavity 86 of the radially outer side.

Figure 11:
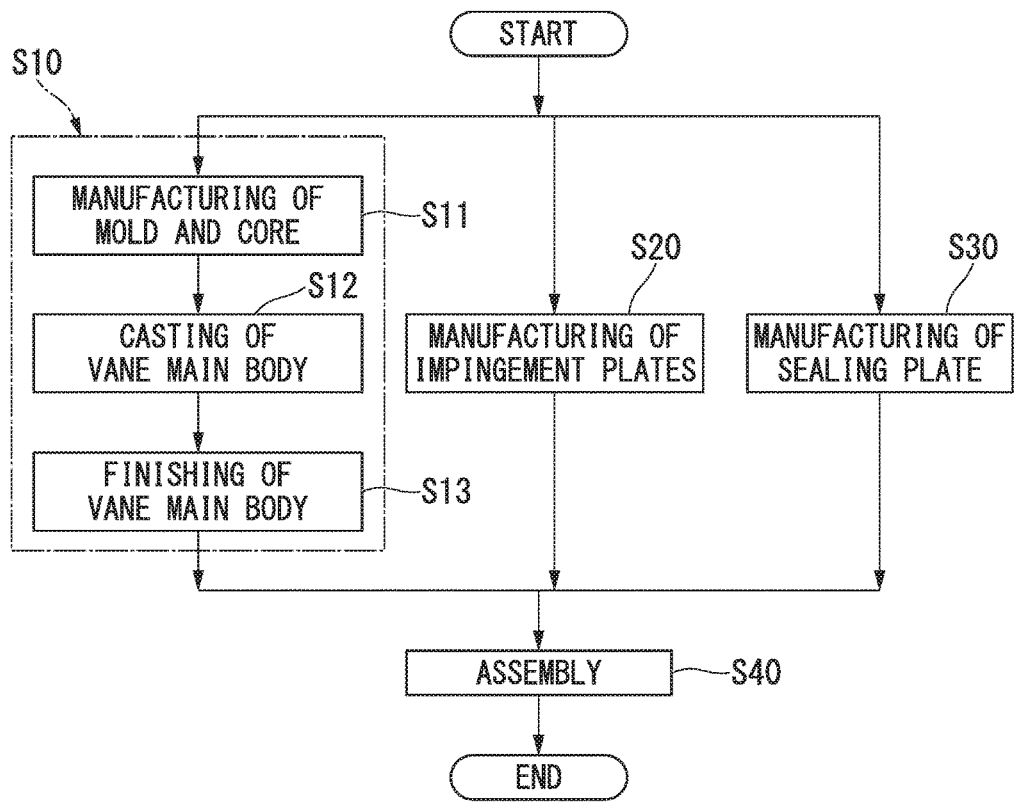
FIG. 11 is a flowchart illustrating a method of manufacturing a vane in the embodiment according to the present invention.

Next, a method of manufacturing the vane 40f of the present embodiment will be described according to a flowchart illustrated in FIG. 11.

In the present embodiment, a process (S10) of manufacturing the vane main body MB, a process (S20) of manufacturing the impingement plates 59 and 101, and a process (S30) of manufacturing the sealing plate 105 are individually performed.

In the process (S10) of manufacturing the vane main body MB, first, a mold and a core for casting the vane main body MB are manufactured (S11). The core is intended to form the cooling air main flow channels 42, etc. in the vane body 41. Next, a molten metal is poured into the mold in which the core is incorporated, and an intermediate product of the vane main body MB is cast (S12). In this intermediate product, the outer shroud 51, the vane body 41, the inner shroud 61, and the retainer 91 are formed in one body. Also, the retainer 91 is formed with the retainer opening 92 described above. Next, a finishing process is performed on the intermediate product to complete the vane main body MB (S13). The finishing process includes polishing a surface of the intermediate product, performing thermal barrier coating on the surface of the intermediate product, machining various cooling air ejection holes 43, 68 and 69, and so on.

In the process (S20) of manufacturing the impingement plates 59 and 101, first, plates corresponding to the shapes and sizes of the impingement plates 59 and 101 are manufactured. Next, a plurality of through-holes are formed in these plates. Finally, a finishing process is performed on the plates in which the plurality of through-holes are formed, i.e., perforated plates, and the impingement plates 59 and 101 are finished.

In the process (S30) of manufacturing the sealing plate 105, first, a plate corresponding to the shape and size of the sealing plate 105 is manufactured. Next, a finishing process is performed on this plate, and the sealing plate 105 is finished.

Once the vane main body MB, the impingement plates 59 and 101, and the sealing plate 105 are finished, these are assembled (S40). The vane 40f of the present embodiment is thus completed.

Figure 12:
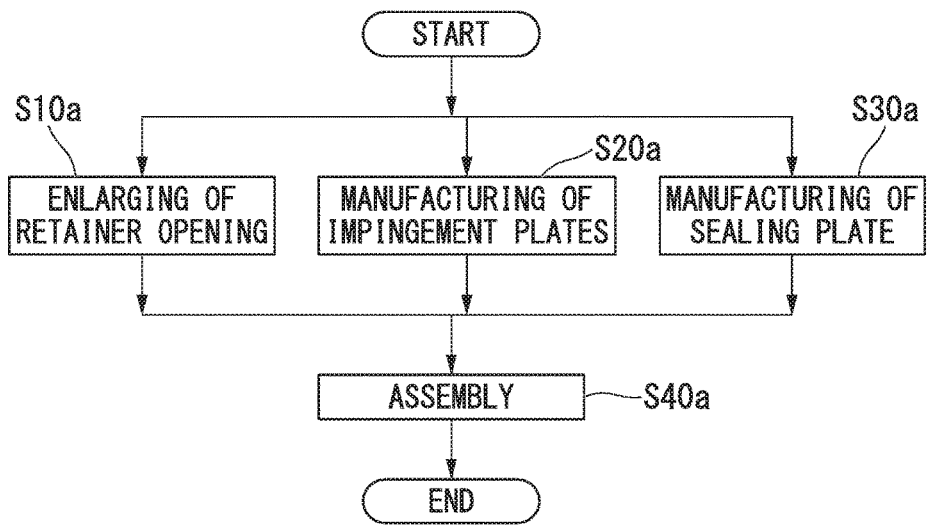
FIG. 12 is a flowchart illustrating a method of remodeling a vane in the embodiment according to the present invention.

Next, a method of remodeling into the vane 40f of the present embodiment will be described according to a flowchart illustrated in FIG. 12.

Here, as an example, an example in which the vane 40c of the comparative example illustrated in FIGS. 9 and 10 is remodeled into the vane 40f of the present embodiment will be described.

In remodeling the vane 40c of the comparative example, the retainer 91c of the comparative example is processed to enlarge the retainer opening 92c by a processing method such as grinding, and the shape and size of the retainer opening 92c are fitted to those of the retainer opening 92 of the present embodiment described above (S10a).

Further, along with the enlargement of the retainer opening 92c, the impingement plate and the sealing plate are separately manufactured (S20a and S30a).

Once remodeling of the vane main body is finished and a new impingement plate and sealing plate are manufactured, these are assembled (S40a). The remodeling of the vane 40c is thus completed.

(First Modification of Vane)

Figure 13:
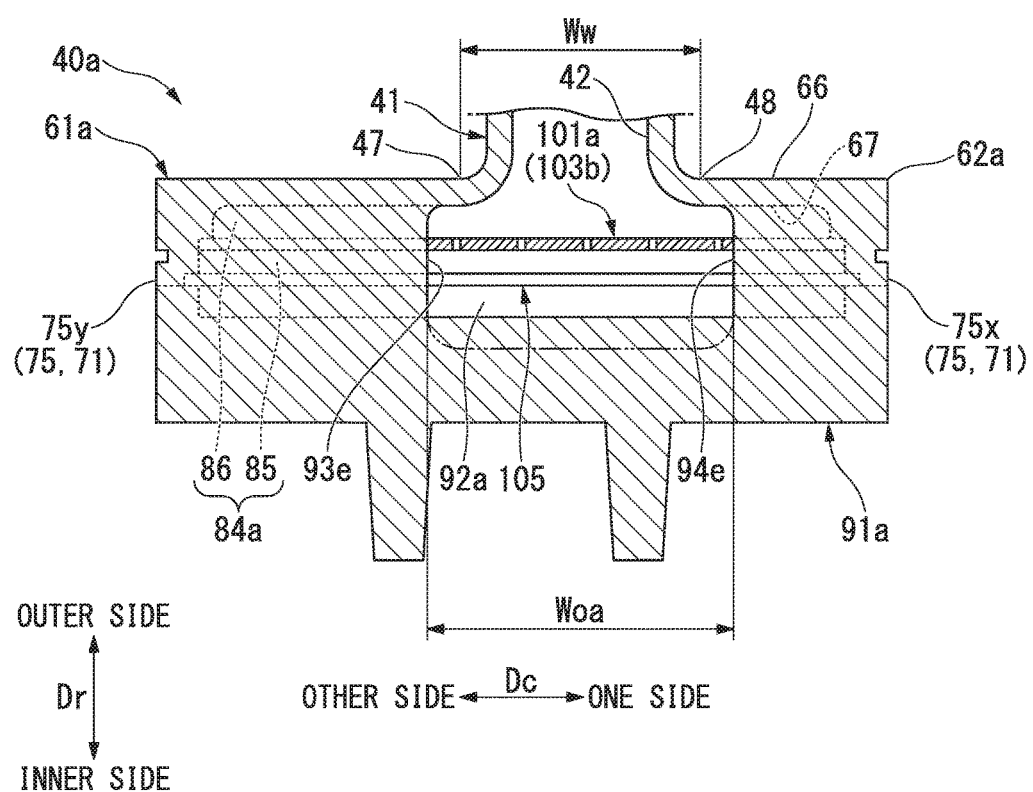
FIG. 13 is a sectional view of major parts of a vane in a first modification of the embodiment according to the present invention.

A first modification of the vane 40f of the above embodiment will be described with reference to FIG. 13.

The size of the retainer opening 92 of the above embodiment is changed in a vane 40a of the present modification, and the other constitutions are the same as those of the vane 40f of the above embodiment.

In the vane 40a of the present modification, a width Woa of a retainer opening 92a in the circumferential direction Dc is narrower than a width of a recess 84a of an inner shroud 61a in the circumferential direction Dc, but is wider than the width Ww of the vane body 41 in the circumferential direction Dc at the radially inner end of the vane body 41 at a position of a retainer 91a in the axial direction Da like the above embodiment. Also, the edge 94e of the retainer opening 92a at the one side in the circumferential direction Dc is located at the one side from the outer surface 48 at the one side of the vane body 41 at the radially inner end of the vane body 41 at the position of the retainer 91a in the axial direction Da. Further, the edge 93e of the retainer opening 92a at the other side in the circumferential direction Dc is located at the other side from the outer surface 47 at the other side of the vane body 41 at the radially inner end of the vane body 41 at the position of the retainer 91a in the axial direction Da. Also, a width of the retainer opening 92a in the radial direction Dr is the same as in the above embodiment.

Like the above embodiment, an area of the retainer opening 92a of the present modification is much greater than an area of the retainer opening 92c of the comparative example. Thus, the rigidity of the retainer 91a of the present modification is lower than that of the retainer 91c of the comparative example. Moreover, in the present modification, a position at which the retainer 91a is provided in the inner shroud 61a and a position at which the vane body 41 is provided in the inner shroud 61a are different from each other in the circumferential direction Dc. For this reason, in the vane 40a of the present modification, too, the rigidity around the inner shroud main body 62a is lower than that of the comparative example. Therefore, in the present modification, even if temperature distribution occurs in the inner shroud main body 62a, thermal stress occurring at the inner shroud main body 62a can be suppressed.

Also, in the present modification, too, the retainer opening 92a is formed in the circumferential direction Dc to be wider than the width Ww of the vane body 41 in the circumferential direction Dc at the radially inner end of the vane body 41 at the position of the retainer 91a in the axial direction Da, and is formed from the position flush with the radially inner surface 67 of the inner shroud main body 62a in the radial direction Dr to the position of the radially inner surfaces of the lateral peripheral walls 75 (downstream edge 96d). For this reason, in the present modification, too, an impingement plate 101a can be disposed over a wide region in the circumferential direction Dc at a portion at which the retainer 91a is located in the axial direction Da in the radially inner surface 67 of the inner shroud main body 62a. Therefore, impingement cooling can be performed on the radially inner surface 67 of the inner shroud main body 62a over a wide region, including the portion at which the retainer 91a is located in the axial direction Da. Accordingly, the portion at which the retainer 91a is located in the axial direction Da within the inner shroud main body 62a of the present modification can be cooled more than that of the comparative example. Thus, in the present modification, from this viewpoint, too, the thermal stress occurring at the inner shroud main body 62a can be suppressed.

As described above, in the present modification, too, the thermal stress occurring at the inner shroud main body 62a can be suppressed more than that of the comparative example. Thus, the durability of the vane 40a can be increased more than that of the comparative example.

(Second Modification of Vane)

Figure 14:
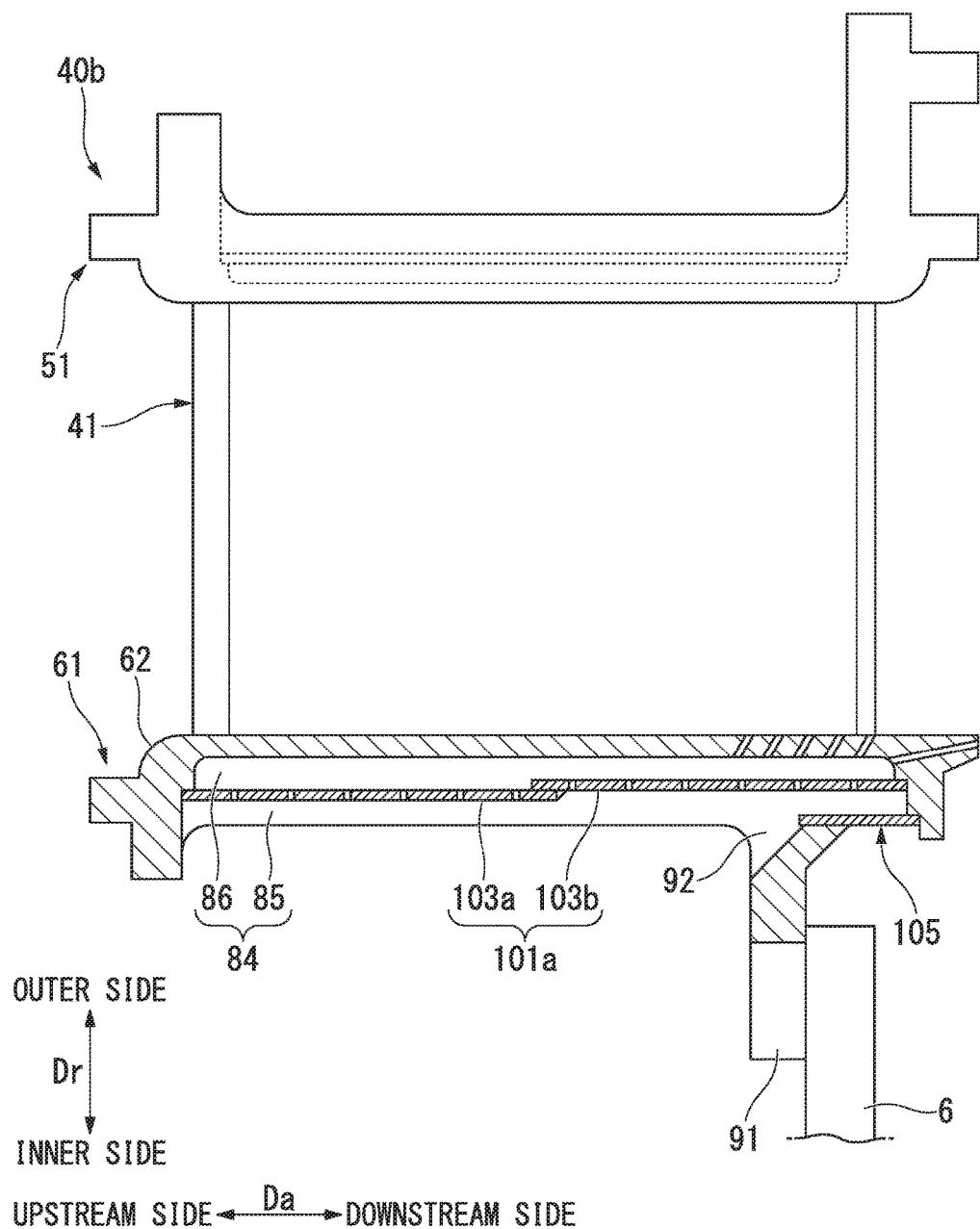
FIG. 14 is a side view in which major parts of a vane are cut out in a second modification of the embodiment according to the present invention.

A second modification of the vane 40f of the above embodiment will be described with reference to FIG. 14.

The impingement plate 101 of the above embodiment is changed in a vane 40b of the present modification, and the other constitutions are the same as those of the vane 40f of the above embodiment.

In the impingement plate 101 of the above embodiment, the single perforated plate is used as the single impingement plate 101 with no change. On the other hand, in the present modification, two perforated plates 103a and 103b are joined in one body, and the joined plates are used as one impingement plate 101a. Of the two perforated plates 103a and 103b, one perforated plate 103a is an upstream perforated plate that partitions a portion located upstream from the retainer 91 in the recess 84 of the inner shroud 61 into the region 85 of the radially inner side and the inner cavity 86 of the radially outer side. Of the two perforated plates 103a and 103b, the remaining perforated plate 103b is a downstream perforated plate that partitions a portion located upstream from the retainer 91, a portion in the retainer opening 92, and a portion located downstream from the retainer 91 in the recess 84 of the inner shroud 61 into the region 85 of the radially inner side and the inner cavity 86 of the radially outer side.

In the above embodiment, the single impingement plate 101 that is long in the axial direction Da needs to be mounted on the inner shroud 61 after being inserted into the retainer opening 92. For this reason, it may take considerable effort to mount the impingement plate 101 on the inner shroud 61 due to a mounting structure between the inner shroud 61 and the impingement plate 101.

The present modification is designed to deal with cases requiring such effort. In the case of the present modification, first, the downstream perforated plate 103b and the upstream perforated plate 103a are temporarily mounted on the inner shroud 61. Next, the downstream perforated plate 103b and the upstream perforated plate 103a are joined in one body by, for instance, welding, and these are used as the single impingement plate 101a. Afterwards, if necessary, the single impingement plate 101a is duly mounted on the inner shroud 61.

In the present modification, the impingement plate 101 of the above embodiment is modified. However, like the present modification, in the first modification, too, two perforated plates may be joined in one body, and these may be used as one impingement plate.

INDUSTRIAL APPLICABILITY

In an aspect of the present invention, it is possible to increase the durability of the vane.

REFERENCE SIGNS LIST

1: gas turbine rotor, 5: gas turbine casing, 10: compressor, 11: compressor rotor, 12: rotor shaft, 13: blade stage, 14: vane stage, 15: compressor casing, 19: air compression flow path, 20: combustor, 21: combustion liner (transition piece), 22: fuel injector, 30: turbine, 31: turbine rotor, 32: rotor shaft, 33: blade stage, 34: vane stage, 34f: first vane stage, 35: turbine casing, 39: combustion gas flow path, 40, 40a, 40b, 40c, 40f: vane, 41: vane body, 51: outer shroud, 52: outer shroud main body, 55: peripheral wall, 54: recess, 61, 61a, 61c: inner shroud, 62, 62a, 62c: inner shroud main body, 63: upstream end face, 64: downstream end face, 68: first cooling air ejection hole, 69: second cooling air ejection hole, 71: peripheral wall, 73: upstream peripheral wall, 74: downstream peripheral wall, 75: lateral peripheral wall, 75x: one lateral peripheral wall, 75y: other lateral peripheral wall, 84, 84a, 84c: recess, 85: region of radially inner side, 86: inner cavity, 91, 91a, 91c: retainer, 92, 92a, 92c: retainer opening, 93: first inner circumferential surface, 93e: edge of other side, 94: second inner circumferential surface, 94e: edge of one side, 95: third inner circumferential surface, 95e: radially outer edge, 96: fourth inner circumferential surface, 101, 101a, 101ca, 101cb: impingement plate, 103a: upstream perforated plate, 103b: downstream perforated plate, 105: sealing plate

The invention claimed is:

1. A vane that is disposed upstream in an axial direction, in which an axis extends, from a blade of a turbine rotor rotating about the axis, the vane comprising:
a vane body configured to extend in a radial direction with respect to the axis;
an outer shroud formed at a radially outer side of the vane body;
an inner shroud formed at a radially inner side of the vane body and configured to form a combustion gas flow path through which a combustion gas flows between the outer shroud and the inner shroud; and
a retainer configured to protrude from the inner shroud to the radially inner side and extend in a circumferential direction centering on the axis at a position between an upstream edge of the inner shroud in the axial direction and a downstream edge of the inner shroud in the axial direction,
wherein the inner shroud is formed with a recess recessed toward the radially outer side of the vane body,
wherein the vane includes an impingement plate which partitions an inside of the recess into a region of the radially inner side and an inner cavity that is a region of the radially outer side and in which a plurality of air holes are formed,
wherein the retainer is formed with a single opening that passes through the retainer in the axial direction and defines a space through which air flows,
wherein the impingement plate extends through the single opening in the axial direction, and
wherein a width of the single opening in the circumferential direction is wider than a width of the vane body in the circumferential direction at a radially inner end of the vane body at a position of the retainer in the axial direction.

2. The vane according to claim 1, wherein:
the inner shroud has an inner shroud main body which extends in the axial and circumferential directions and whose radially outer surface comes into contact with the combustion gas, and a peripheral wall that protrudes from the inner shroud main body to the radially inner side along an outer peripheral edge of the inner shroud main body;
the recess is formed so as to be recessed toward the radially outer side by the inner shroud main body and the peripheral wall; and
a radially inner edge of the single opening is located at the radially inner side relative to a radially inner surface of the impingement plate, and a radially outer edge of the single opening is located at the radially outer side relative to a radially outer surface of the impingement plate.

3. The vane according to claim 1, wherein:
one of edges of the single opening separated from each other in the circumferential direction is located with respect to one outer surface of the vane body at one circumferential side of the radially inner end of the vane body in an axial alignment with the retainer, and
the other of the edges of the single opening separated from each other in the circumferential direction is located with respect to the other outer surface of the vane body the other circumferential side of the radially inner end of the vane body in the axial alignment with the retainer.

4. The vane according to claim 1, wherein the impingement plate is is formed by a single perforated plate that extends upstream and downstream from the retainer.

5. The vane according to claim 4, wherein the single perforated plate forming the impingement plate is configured in such a manner that a perforated plate located upstream and a perforated plate located downstream are joined in one body.

6. The vane according to claim 1, wherein the vane includes a sealing plate that is disposed downstream from the retainer and blocks a portion of an opening of the recess downstream from the retainer.

7. The vane according to claim 2, wherein:
the peripheral wall of the inner shroud has a pair of lateral peripheral walls that are opposite to each other across the inner cavity at an interval in the circumferential direction; and
one of edges of the single opening separated from each other in the circumferential direction is located within a surface of one of the pair of lateral peripheral walls which is located at the same side of the one of the edges of the single opening, and
the other of the edges of the single opening separated from each other in the circumferential direction is located within a surface of the other of the pair of lateral peripheral walls which is located at the same side of the other of the edges of the single opening.

8. The vane according to claim 2, wherein:
the inner shroud main body is formed with a downstream end face facing downstream; and
the inner shroud is formed with a cooling air ejection hole that passes through the inner shroud from the inner cavity and is open at the downstream end face of the inner shroud main body.

9. The vane according to claim 8, wherein a plurality of the cooling air ejection holes are formed in the inner shroud so as to be arranged in the circumferential direction.

10. The vane according to claim 2, wherein the inner shroud main body is formed with a cooling air ejection hole that passes through the inner shroud main body from the inner cavity toward the radially outer side.

11. A gas turbine comprising:
a turbine rotor;
a turbine casing configured to cover the turbine rotor so that the turbine rotor is rotatable in the turbine casing;
combustors fixed to the turbine casing to produce a combustion gas; and
a plurality of vanes fixed to an inner circumferential side of the turbine casing, wherein each vane is according to claim 1.

12. A method of manufacturing a vane which is disposed upstream in an axial direction, in which an axis extends, from a blade of a turbine rotor rotating about the axis, and includes a vane body configured to extend in a radial direction with respect to the axis, an outer shroud formed at a radially outer side of the vane body, an inner shroud formed at a radially inner side of the vane body and configured to form a combustion gas flow path through which a combustion gas flows between the outer shroud and the inner shroud, and a retainer configured to protrude from the inner shroud to the radially inner side and extend in a circumferential direction centering on the axis at a position between an upstream edge of the inner shroud in the axial direction and a downstream edge of the inner shroud in the axial direction, the inner shroud being formed with a recess recessed toward the radially outer side of the vane body, and the vane including an impingement plate which partitions an inside of the recess into a region of the radially inner side and an inner cavity that is a region of the radially outer side and in which a plurality of air holes are formed, the retainer being formed with a single opening that passes through the retainer in the axial direction and defines a space through which air flows, and the impingement olate extends through the single opening in the axial direction,
the method comprising forming the following in one body by casting: the retainer in which the single opening is formed such that a width thereof in the circumferential direction is wider than a width of the vane body in the circumferential direction at a radially inner end of the vane body at a position of the retainer in the axial direction, the vane body, the outer shroud, and the inner shroud.

13. A method of remodeling a vane which is disposed upstream in an axial direction, in which an axis extends, from a blade of a turbine rotor rotating about the axis, and includes a vane body configured to extend in a radial direction with respect to the axis, an outer shroud formed at a radially outer side of the vane body, an inner shroud formed at a radially inner side of the vane body and configured to form a combustion gas flow path in which a combustion gas flows between the outer shroud and the inner shroud, and a retainer configured to protrude from the inner shroud to the radially inner side and extend in a circumferential direction centering on the axis at a position between an upstream edge of the inner shroud in the axial direction and a downstream edge of the inner shroud in the axial direction, the inner shroud being formed with a recess recessed toward the radially outer side of the vane body, and the vane including an impingement plate which partitions an inside of the recess into a region of the radially inner side and an inner cavity that is a region of the radially outer side and in which a plurality of air holes are formed, the retainer being formed with a single opening that passes through the retainer in the axial direction and defines a space through which air flows, and the impingement plate extends through the single opening in the axial direction,
the method comprising processing the retainer such that a width of the single opening in the circumferential direction becomes wider than a width of the vane body in the circumferential direction at a radially inner end of the vane body at a position of the retainer in the axial direction.

14. The method of remodeling a vane according to claim 13, wherein:
prior to processing the retainer, the width of the single opening in the circumferential direction is narrower than the width of the vane body in the circumferential direction at the radially inner end of the vane body at the position of the retainer in the axial direction; and
during processing of the retainer, the retainer is ground to enlarge the single opening.

* * * * *